JOHN D. GLENN
OWEN G. ROBBINS
WARREN C. SCHWEMER
JOSEPH R. SILVERMAN
INVENTORS

AGENT

JOHN D. GLENN
OWEN G. ROBBINS
WARREN C. SCHWEMER
JOSEPH R. SILVERMAN
INVENTORS

BY J.H.C. Goldwire
AGENT

JOHN D. GLENN
OWEN G. ROBBINS
WARREN C. SCHWEMER
JOSEPH R. SILVERMAN
INVENTORS

BY
AGENT

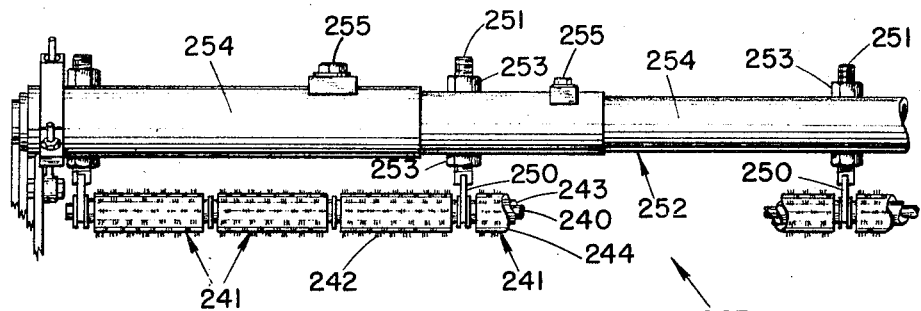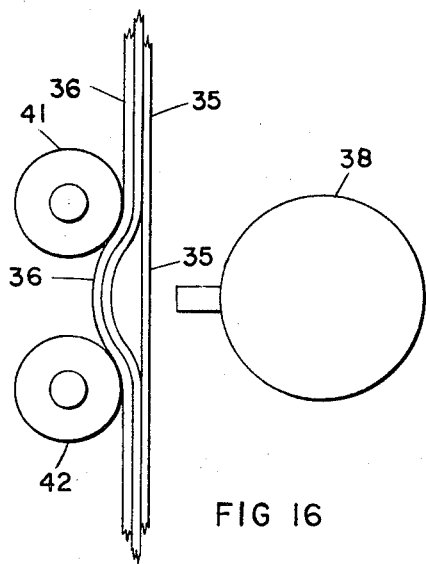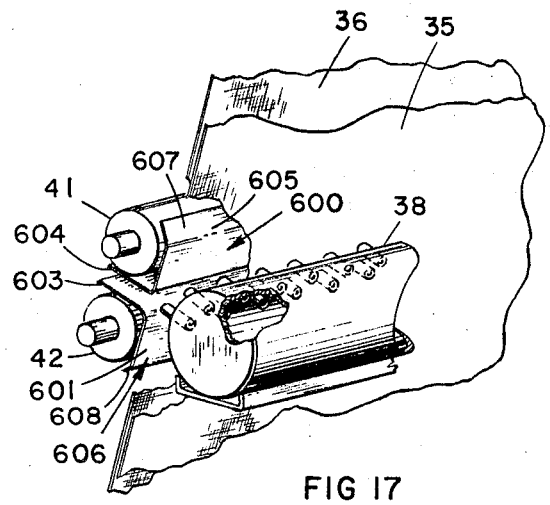

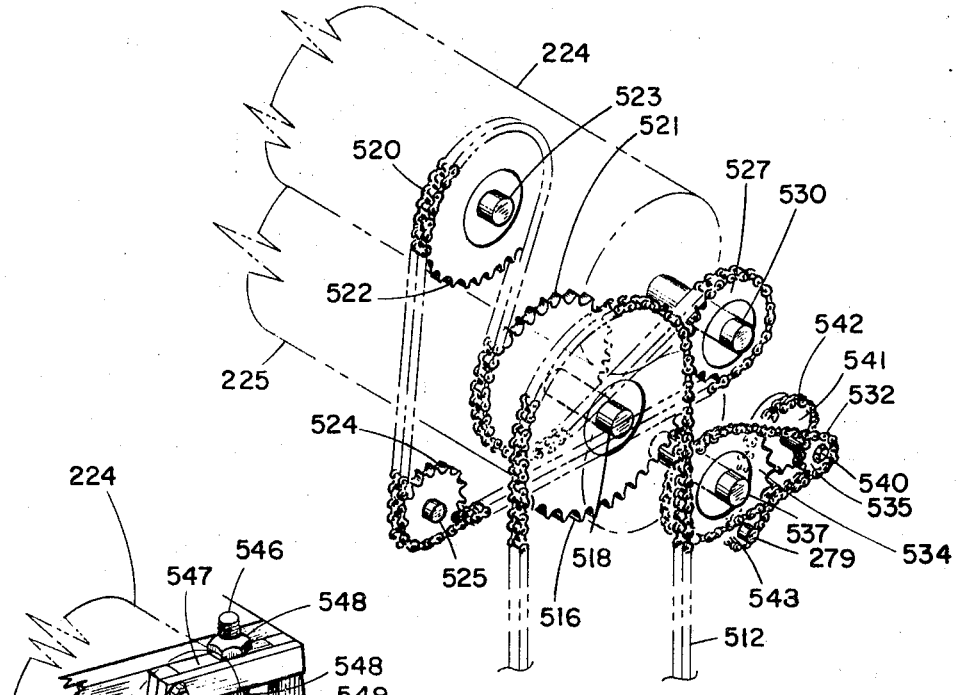
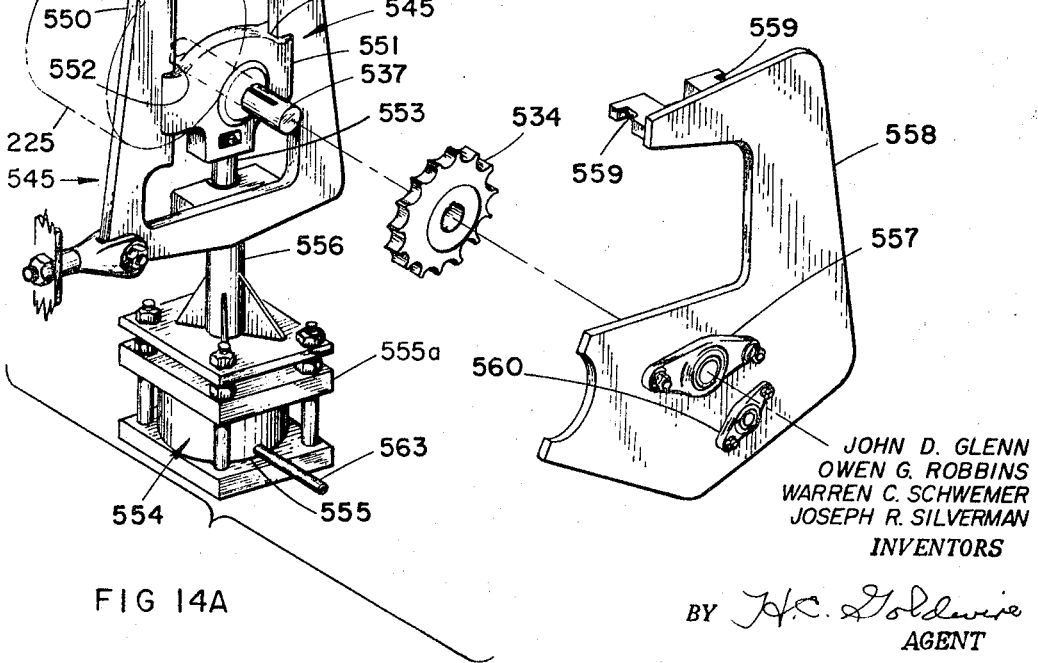

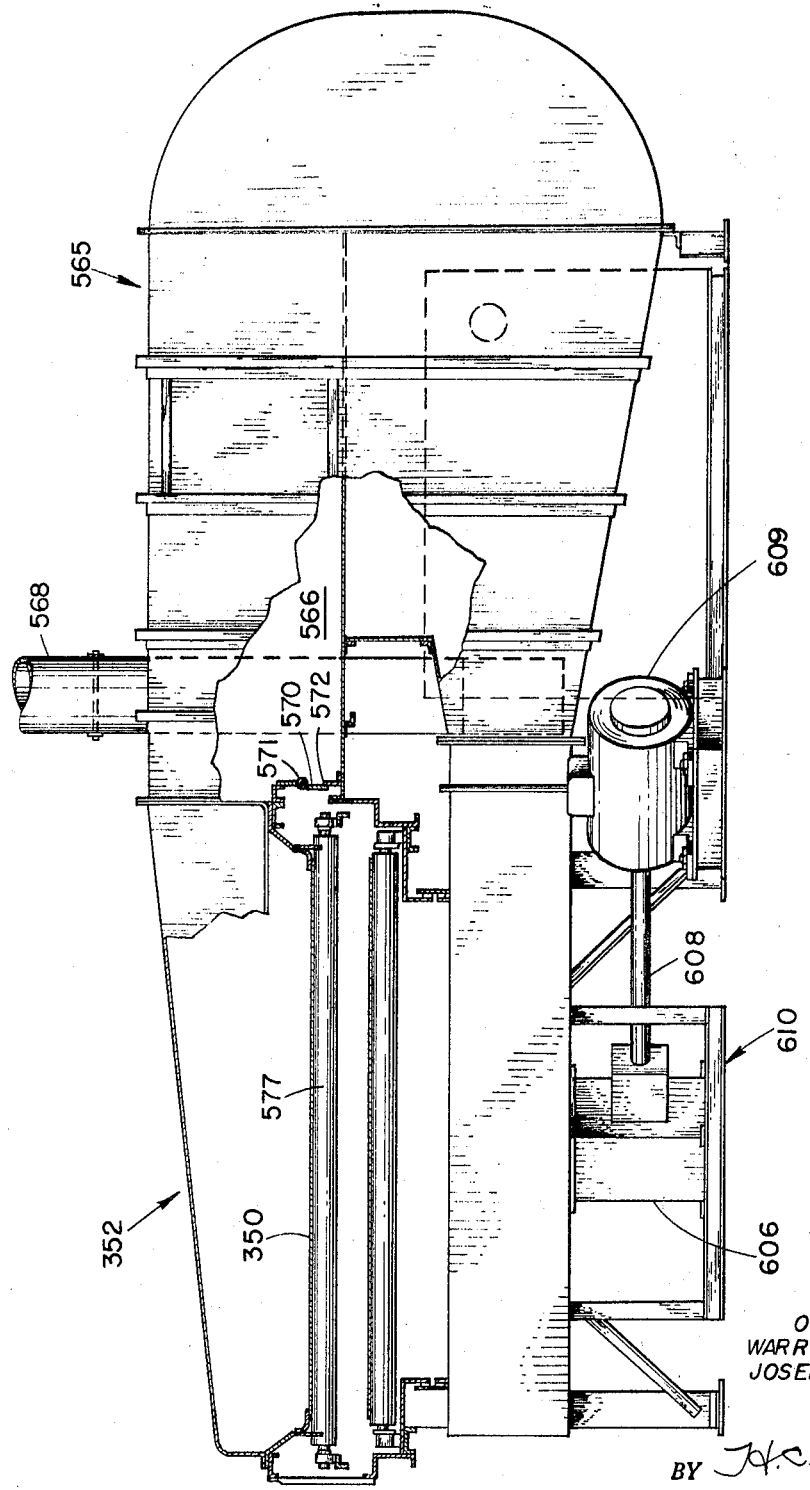

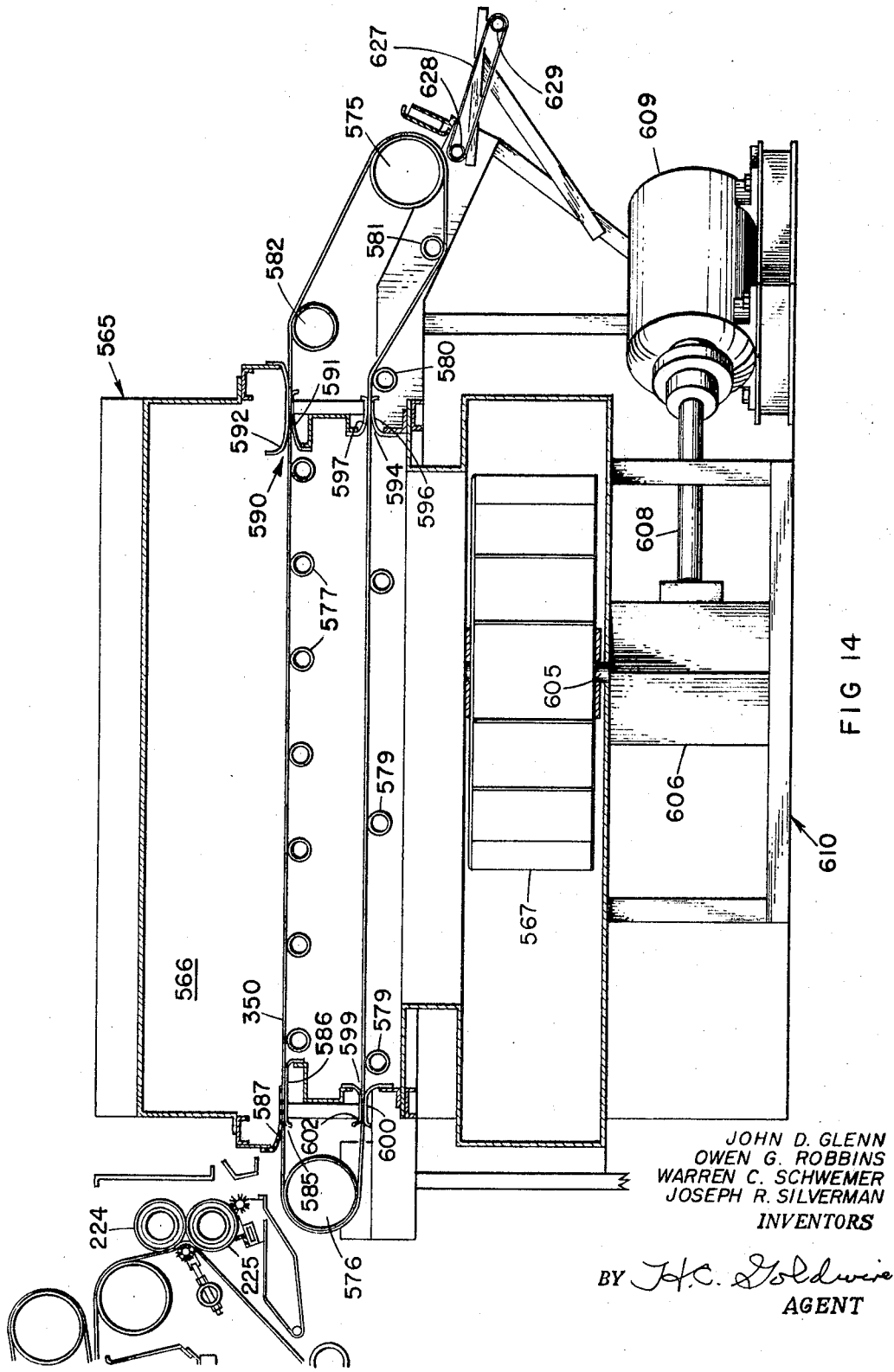

United States Patent Office 3,431,753
Patented Mar. 11, 1969

3,431,753
APPARATUS FOR CLEANING SOILED MATERIALS
John D. Glenn and Owen G. Robbins, Dallas, Warren C. Schwemer, Arlington, and Joseph R. Silverman, Dallas, Tex., assignors, by mesne assignments, to Jet Stream Products, Inc., Reno, Nev., a corporation of Nevada
Filed May 18, 1964, Ser. No. 368,038
U.S. Cl. 68—9    3 Claims
Int. Cl. D06f *31/00, 41/00*

This invention relates to an apparatus for cleaning soiled materials.

Another object is to provide a new and improved apparatus for washing soiled particles having a foraminous carrier means for moving the soiled materials in flat condition sequentially through a wash tank and a plurality of rinse tanks in order to submerge the material in a wash solution and then sequentially in a plurality of rinse liquids, the apparatus having means for subjecting opposite sides of the material before it moves into the wash solution to jet streams of the wash solution to wetten thoroughly the material with the wash solution and to separate insoluble soil particles from the material prior to its immersion in the wash solution and having means for subjecting opposite sides of the material to jet streams of the rinse liquid from each tank as the material moves through each rinse tank.

Another object is to provide an apparatus of the type described having wringer means for removing excess wash solution and excess rinse liquid from the material prior to its movement from each wash and rinse tank.

Still another object is to provide an apparatus of the type described wherein the carrier means comprises a pair of foraminous endless belts between which the fabric is held in a flat condition during its movement through the apparatus and having means for separating the fabric from the foraminous belts upon the completion of the rinsing operations.

A still further object is to provide an apparatus of the type described wherein the jet stream forming means provides two sets of jet streams on opposite sides of the conveyor belts at vertically spaced locations while the belts and the material carried thereby are moving through substantially vertical portions of the paths of movements in order that the solid particles separated from the material fall free of the material and wash solution having a high concentration of soil dissolved therein while passing through the material is replaced by fresh wash solution.

Additional objects and advantages of the invention will be readily apparent from the reading of the following description of a device constructed in accordance with the invention, and reference to the accompanying drawings thereof, wherein:

FIGURE 11 is a fragmentary plan view of one of the stripper means of the washing apparatus;

FIGURE 13 is a perspective fragmentary view of the transmission means;

FIGURE 14A is a fragmentary exploded view of the mounting means of a pair of wringer rollers of the washing apparatus;

FIGURE 14 is a partly sectional side view of the dryer;

FIGURE 15 is a vertical view, with portions broken away, of the dryer;

Figure 1:
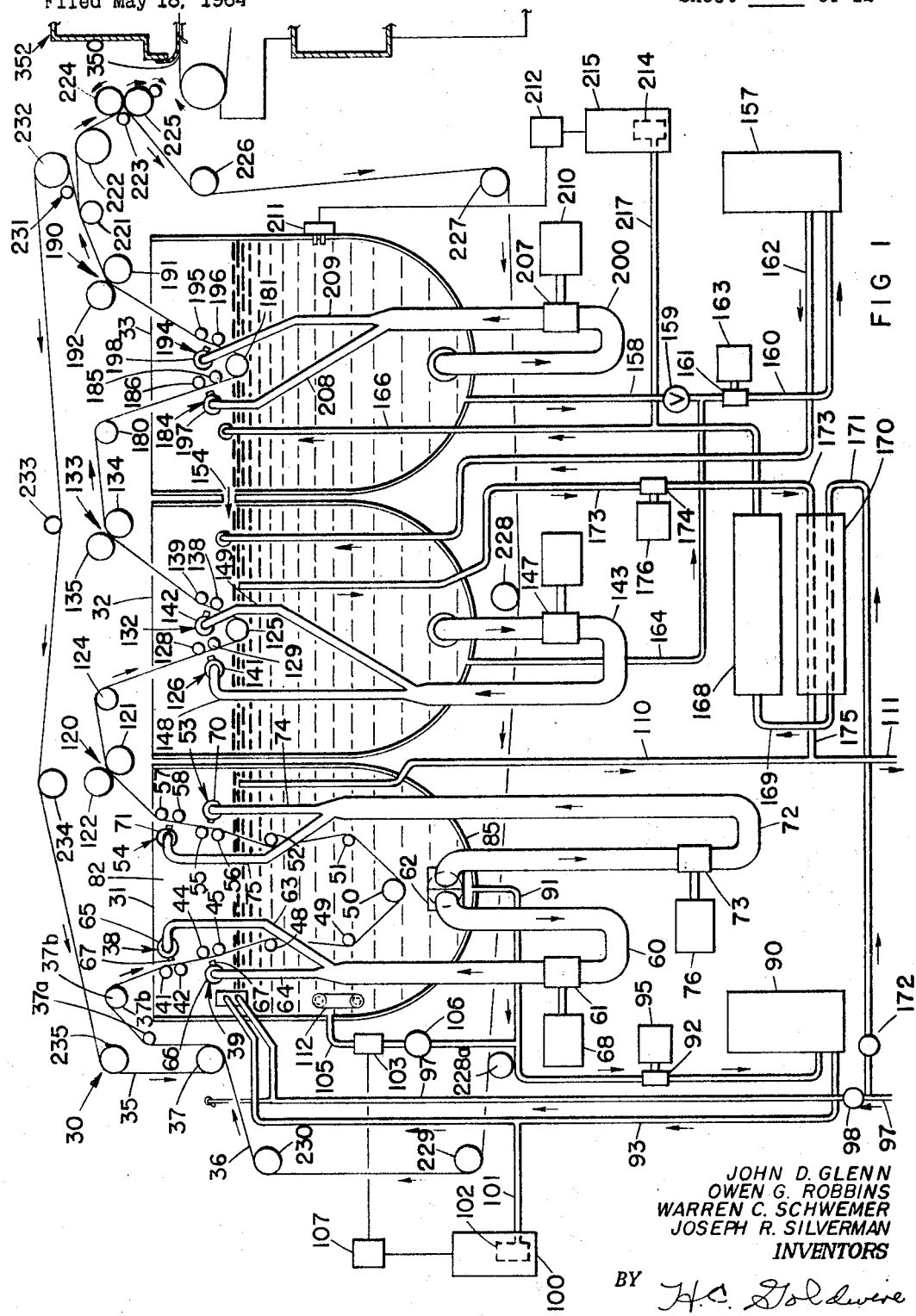
FIGURE 1 is a diagrammatic illustration of a washing apparatus for cleaning soiled materials usable in the method of the invention for cleaning soiled materials.
Figure 2:
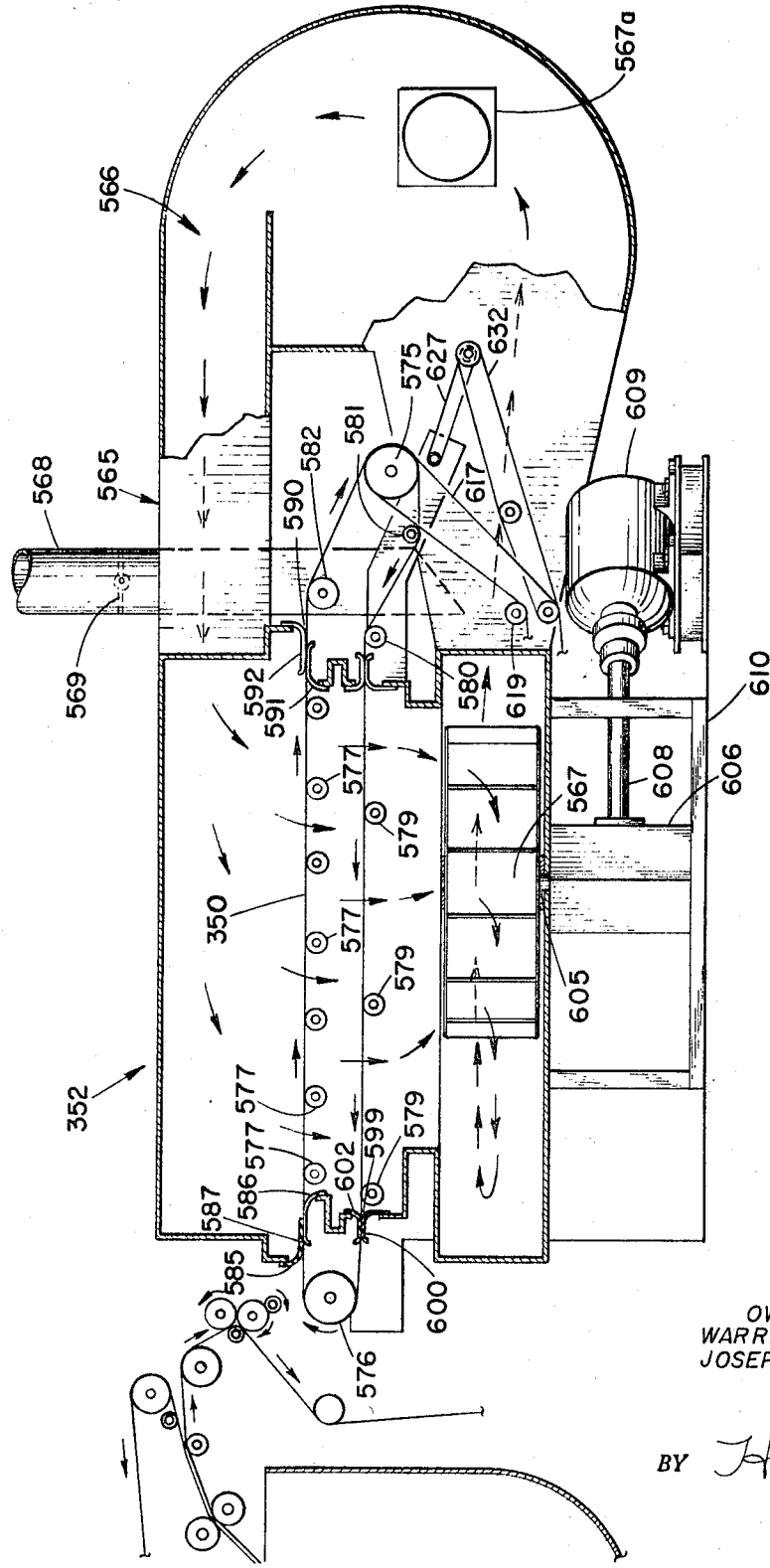
FIGURE 2 is a diagrammatic illustration, with some parts broken away, of the dryer used with the washing apparatus illustrated in FIGURE 1.
Figure 3:
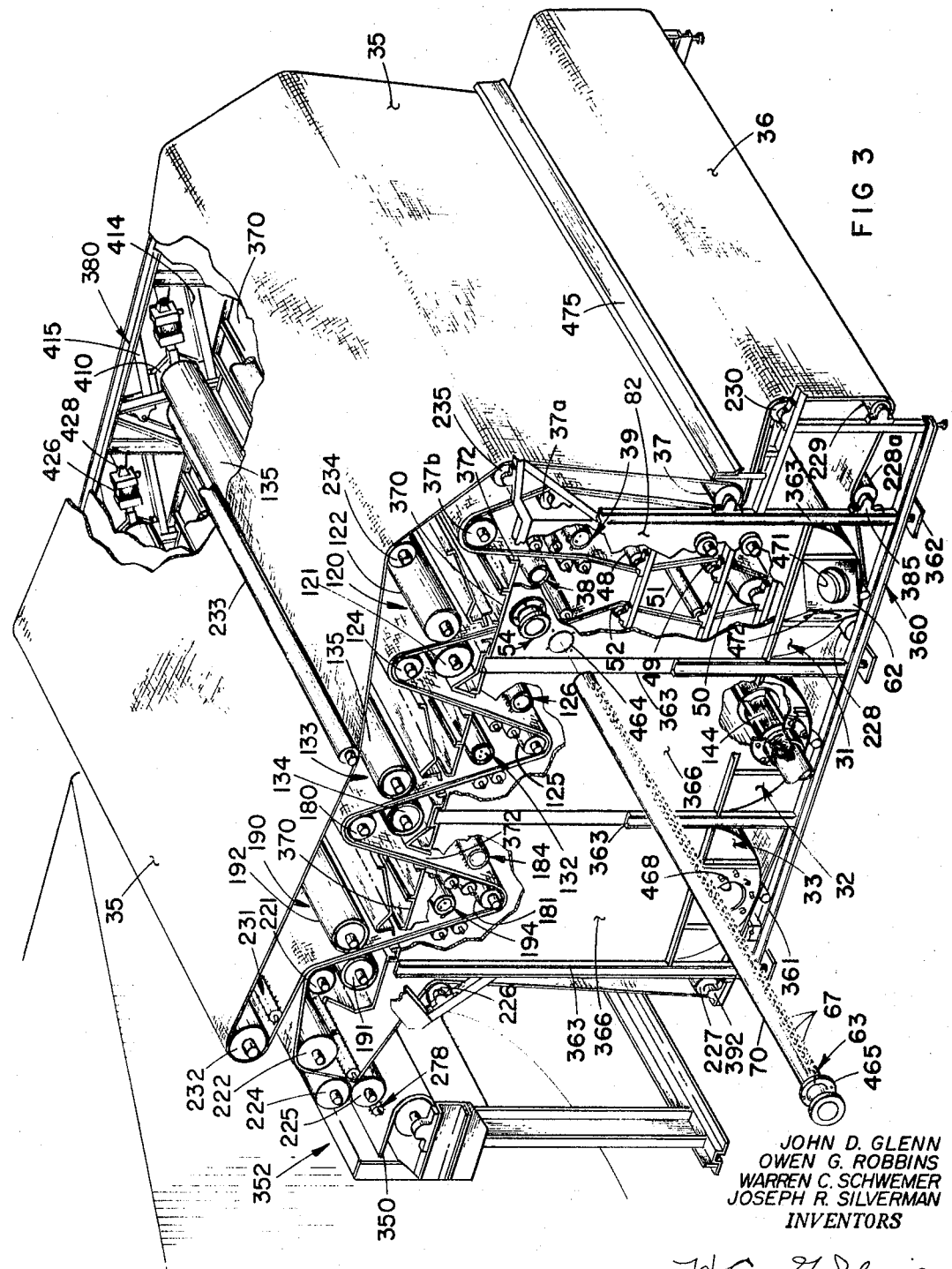
FIGURE 3 is a perspective view of the washing apparatus with some parts thereof removed and some broken away and with a nozzle assembly thereof in exploded relationship thereto.

FIGURE 16 is a fragmentary perspective view of a pair of support rollers showing the manner in which the material is displaced away from a nozzle assembly if the support rollers are spaced too far apart; and FIGURE 17 is a view similar to FIGURE 16 showing slide plates secured to the support rollers for narrowing the gap between the support rollers and preventing displacement of the material away from the nozzle assembly.

Referring now to the drawings, the washing apparatus 30 includes a wash tank 31 and a pair of rinse tanks 32 and 33 through which the material which is to be washed is moved sequentially by a pair of foraminous endless conveyor belts 35 and 36. The belts have closed paths of movements including portions parallel and adjacent one another which extend forwardly from the roller 37 so the material to be washed is held in a flat condition between the belts in such predetermined portions of their paths of movement through the wash and rinse tanks. The wash tank 31 is filled with aqueous wash solution of a plurality of active agents, such as an alkali for saponifying oil or grease soil, a detergent for removing nonsaponifiable type greasy soil from the material by the physical absorption of detergent molecules on the soil to form a colloidal species which is readily dispersed in the wash solution, a surfactant for reducing the surface tension of the water to facilitate the wetting and penetration of the material by the wash solution and the dissolution of soluble soil from the material, and a bleaching agent for converting discolorations or stains in the material to colorless substances.

In order to facilitate such action of these active agents of the wash solution and to separate insoluble soil from the material during the passage of the material through the wash tank 31, a pair of jet stream forming means or nozzle assemblies 38 and 39 are positioned in vertically spaced relation to one another and on opposite sides of the pair of belts in the upper portion of the wash tub above the wash solution contained therein for directing jet streams of the wash solution to opposite sides of the belts and of the material to cause the wash solution to pass through the belts and through the material carried therebetween and thoroughly penetrate and wetten the material and the soil embedded or carried thereon and also to mechanically remove or separate both soluble and insoluble particles from the material. The belts and the material of course have apertures or interstices through which the jet streams pass. The jet stream from the nozzle assembly 38 separates and throws off soil particles from one side of the belts and the material and the jet stream from the nozzle assembly 39 separates and throws off soil particles from the other side of the belts and the material as the belts and the material are in substantially vertical position.

A pair of vertically spaced support rollers 41 and 42 are positioned immediately above and below the jet stream produced by the nozzle assembly 38 to hold the belts and the material carried thereby at a predetermined distance from and against movement away from the nozzle assembly 38 in order to ensure that the jet stream impinges with an optimum force on the material carried between the belts. A similar pair of vertically spaced support rollers 44 and 45 positioned immediately above and below the jet stream produced by the nozzle assembly 39 similarly hold the belts and the material carried thereby a predetermined distance from the nozzle assembly 39 and against movement away therefrom.

A plurality of guide or direction rollers 48, 49, 50, 51 and 52 extend transversely through the wash tank to guide the movement of the belts through the wash solution in the tank below and between the first pair of nozzle assemblies 38 and 39 and a second pair of nozzle assemblies 53 and 54. The jet stream from the nozzle assembly 53 is directed at one side of the belts and the material carried thereby between the spaced support rollers 55 and 56 and the jet stream from the nozzle assembly 54 is directed at the other side of the belts and between the spaced support rollers 57 and 58 so that the material after passing through the wash solution in the wash tanks is again sequentially subjected to oppositely directed jet streams.

The jet streams impinge on the material with maximum force and pass therethrough since the material and belts are above the surface of the wash solution and the support rollers are spaced above and below the transverse horizontal lines or areas of impingement of the jet streams on the material.

The wash solution in the wash tank is continuously circulated from the lower portion of the wash tub to the nozzle assemblies, and then back into the wash tank. Such circulation, as well as the rapid movement of the belts through the wash solution in the tank, maintains the wash solution in a state of extreme turbulence and ensures that the concentration of the active agents at the material-wash solution interface is not depleted and that the wash solution continuously circulates through and past the material during the movement of the material through the wash solution.

The wash solution circulating system includes a conduit 60 in which is connected a pump 61. One end of the conduit is connected to a manifold 62 of the wash tank which communicates with the interior of the wash tub and its other end is provided with the branch conduits 63 and 64. The branch conduit 63 is connected to one end of the nozzle pipe 65 of the nozzle assembly 38 and the branch conduit 64 is connected to the nozzle pipe 66 of the nozzle assembly 39. The nozzle pipes are provided with a plurality of nozzles 67 through which the wash solution is ejected to form a continuous jet stream at the location of the impingement of the jet stream with the belts and the material carried thereby. The pump 61 is driven by an electric motor 68.

The wash solution from adjacent the bottom of the wash tank is similarly pumped to the nozzle pipes 70 and 71 of the nozzle assemblies 53 and 54 through a conduit 72 having a pump 73 mounted therein and having the branch ducts 74 and 75 connected to the nozzle pipes 70 and 71, respectively. The pump may be driven by a separate electric motor 76.

The manifold 62 is mounted on the exterior of the side wall of the wash tank adjacent its lower end and communicates with one end of a tubular strainer pipe 81 which extends outwardly of the end wall 82 of the wash tub. The strainer has a plurality of spaced apertures and extends through a plurality of reinforcing rings 83 secured to and resting on the brackets 84 rigidly secured to the arcuate bottom wall section 85 of the wash tub. The strainer permits flow of wash solution thereinto while preventing entrance of large particles thereinto and their consequent recirculation onto the material.

The circulation of the solution by the two pumps 61 and 73 through the nozzle assemblies in the form of jet streams causes the wash solution to be maintained in a state of extreme agitation or turbulence during the operation of the apparatus. The jet streams flow in substantially horizontal oppositely directed paths through the belts so that the material moved by the carrier belts is thoroughly penetrated and wettened by the jet streams due both to the high velocity of the jet streams and the presence of the active agents, such as detergents and surfactants, in the solution which lower the surface tension of the solution. The jet streams also mechanically remove or throw off soil particles from the material. The jet stream from the nozzle assembly 38 causes any relatively large insoluble particles adhering to one or left side of the material to be thrown off to the left. FIGURE 1, and through the apertures of the foraminous belt 36 whose apertures are larger than the apertures or interstices of the material. At the same time the jet stream from the nozzle assembly 38 tends to separate or knock off any particles adhering to the opposite or right side of the material. The jet stream produced by the nozzle assembly 39 similarly separates or moves insoluble particles from the two sides of the material. Since the belts at the locations of the impingement of the jet streams therewith are moving substantially vertically, such soil particles do not fall back onto the belts but are carried a distance from the belts to fall back into the solution in the tank. The upper level of the solution is below the lowermost nozzle assemblies so that the jet streams are not retarded or slowed down due to any back pressure which would develop if the jet streams had to traverse the wash solution itself. During such penetration or passage through the material, the jet streams of the wash therefore mechanically separate the soil particles from the material and also bring the active agents of the solution into intimate and thorough contact with all portions of the material so that such agents act upon the soluble soil and dissolve it or change its chemical composition and thus wash or clean the material of the soil and change stains into colorless substances. The wash solution is continuously circulated during the operation of the washing apparatus through a suitable filter 90 by means of a conduit 91 which opens into the bottom of the wash tank through the bottom wall section 85 thereof below the tubular strainer 81, a pump 92 connected in the conduit 91 and a conduit 93 which opens into the upper end of the wash tank. The pump 92 may be driven by a suitable electric motor 95. The soil particles which gravitate to the bottom of the tank are moved with the wash solution to the filter 90 where they are mechanically separated from the wash solution and thus filtered wash solution is returned to the tank through the conduit 93.

An inlet conduit 97 connected to any suitable source of water under pressure and provided with a valve 98 opens into the wash tank.

The active agents of the aqueous wash solution may be added to the wash solution in the tank from a supply reservoir 100 through the conduit 101 which is connected to the conduit 93. A pump 102 operatively associated with the reservoir may pump the active agents from such reservoir into the wash tank. While a single reservoir 100 has been illustrated, it will be apparent that a separate such reservoir for each of the active agents may be provided and the active agent in each such reservoir is then transferable into the wash tank by suitable pump and conduit means.

Any suitable sensing device or devices 103 for determining various characteristics of the wash solution, such as the pH thereof, may be connected in a conduit 105 which may also be provided with a valve 106 connected between an intermediate portion of the wash tank and the filter inlet conduit 91 to permit selective flow of the wash solution therethrough. Any such sensing device may be connected to a suitable recording, indicating, or control device 107 for recording or indicating the characteristic or for controlling the operation of any suitable means such as the pump 102 to automatically maintain such characteristics of the wash solution within predetermined limits by adding the active agents thereto as required.

An overflow pipe 110 opens at the top level of the wash solution in the wash tank to permit the overflow to flow into a drain conduit 111 and thus prevent the wash solution in the tubs from rising above a predetermined level.

A heating unit 112, which may compose a plurality of electric heating elements, such as "Calrods," one or more steam coils, or the like is also positioned within the wash tank adjacent the bottom end thereof to maintain the wash solution at a desired temperature, for example 180 degrees Fahrenheit. The electric or other heating elements preferably are thermostatically controlled in the usual manner.

A wringer assembly 120 disposed immediately above and forwardly of the nozzle assembly 54 of the wash tank includes a lower wringer roller 121 and an upper wringer roller 122 movable toward and away from the lower roller between which the conveyor belts move. The wringer rollers compress the conveyor belts and the material held therebetween to wring the wash solution out of the material and the belts and back into the wash tank in order that the concentration of the wash solution in the first rinse solution be as low as possible.

From the wringer assembly 120 the conveyor belts move over a direction changing roller 124 downwardly into the first rinse tank 32 and to a lower direction changing roller 125 past a nozzle assembly 126, identical in structure to the nozzle assemblies of the wash tank, which directs a jet stream of the rinse solution in the first rinse tank to one side of the conveyor belts and the material being carried thereby at the line or narrow transverse area between the vertically spaced support rollers 128 and 129 which hold the belts and the material spaced a predetermined distance from the nozzle assembly and against movement away therefrom. The conveyor belts move through the first rinse solution and about the middle lower direction changing roller 125 and then upwardly past a nozzle assembly 132 to a wringer assembly 133. The nozzle assembly 132 directs a jet stream of the first rinse solution from the first rinse tank 32 to the other side of the belts and the material along a transverse line between the support rollers 138 and 139 which hold the belts against movement away from the nozzle assembly.

The jet streams of the first rinse solution from the two nozzle assemblies impinge on the belts and the material sequentially on opposite sides thereof with a relatively great force. The rinse water velocity need not be as high as the wash water velocity since the main item of the rinse operation is the replacement of the wash water in the cloth with clean rinse water. In a preferred embodiment, the rinsing operation has been accomplished with an average rinse water velocity of the order of 900 inches/second. The rinse solution is forced through the belts and the material and replaces any wash solution still absorbed or held by the material as the belts and material move through the first rinse tank. Fresh rinse solution having a low concentration of wash solution thus replaces the wash solution at and in the material, whose content of wash solution prior to rinsing may be relatively high, as the material is moved through the first rinse tank.

The first rinse solution is circulated from the bottom of the first rinse tank and to the nozzle pipes 141 and 142 of the nozzle assemblies 126 and 132, respectively, through a conduit 143, one of whose ends is connected to a tubular perforate strainer 144 which extends through the reinforcing rings 145 mounted on the brackets 146 rigidly secured to the bottom 147a of the rinse tank 32, by means of the pump 147 connected in the conduit 143. The conduit 143 has branch conduits 148 and 149 connected to the nozzle pipes of the nozzle assemblies 126 and 132, respectively.

Rinse solution is continuously supplied to the first rinse tank 32 from the second rinse tank 33 through the overflow conduit 154 connecting the two rinse tanks. In addition, the rinse solution from the second rinse tank 33 may be circulated through a suitable filter 157, which may be of any suitable type which removes soil from the rinse solution, by means of the conduit 158 open to the lower end of the second rinse tank 33 and provided with a valve 159 and the conduit 160 in which a pump 161 is connected and the conduit 162 which opens into the first rinse tank adjacent the upper end thereof. The pump 161 may be driven by an electric motor 163. The rinse solution in the first tank 32 may also be circulated through the filter 157 by means of a conduit 164 which opens to the bottom of the first rinse tank and to the conduit 160 upstream of the pump 161.

The inlet conduit 166 is connected to the main water line 97 through a heater 168, a conduit 169, a heat exchanger 170, and a conduit 171 in which a valve 172 is connected.

The overflow from the first rinse tank 32 is conducted preferably to the waste or drain line 111 through the overflow conduit 173, whose upper end opens at a desired level or height within the first rinse tank and in which is connected a pump 174, the heat exchanger 170 and the conduit 175. This overflow is at substantially the rate at which water is being introduced into the second rinse tank through the inlet conduit 166.

The heat exchanger extracts heat from the waste rinse solution from the first rinse tank as it flows to the drain line and transfers it to the fresh water being continuously introduced into the second rinse tank 33 through the inlet conduit 166. The pump 174, driven by an electric motor 176, is provided in the overflow conduit 173 to overcome line and heat exchanger pressure losses at the required flow rate since the rate of flow of water through the conduit 166 into the second rinse tank is quite great and the overflow conduit 173, which is of relatively small orifice, would not carry off, by gravity alone, the excess rinse solution from the first rinse tank 32 at as great a rate as the rate of the introduction of fresh water into the second rinse tank 33.

The conveyor belts 35 and 36, and the material carried thereby upon moving from the wringer assembly 133 which removes excess rinse water from the material the belts and causes it to flow back into the first rinse tank 32, pass over the direction changing roller 180 and then downwardly to a direction changing roller 181 extending transversely through the second rinse tank and past the nozzle assembly 184 which causes a jet stream of the wash solution from the second rinse tank to impinge on one side of the belts and the material carried thereby along a transverse line or area between the vertically spaced support rollers 185 and 186 which hold the conveyor belts against movement away from the nozzle assembly. The endless belts move from the direction changing roller 181 to the wringer assembly 190, which includes the lower roller 191 and the upper roller 192, past the nozzle assembly 194. The nozzle assembly 194 directs a jet stream of the rinse solution from the second rinse tank to the opposite sides of the belts and the material between the vertically spaced support rollers 195 and 196.

Water from the second rinse tank is circulated to the nozzle pipes 197 and 198 of the nozzle assemblies 184 and 194, respectively by means of the conduit 200, one of whose ends is connected to the tubular perforate filter 201 which extends through the reinforcing rings 203 rigidly secured to the mounting brackets 204 rigidly secured to the bottom 205 of the second rinse tank in any suitable manner. The conduit 200 has a pump 207 connected therein and its branch conduits 208 and 209 are connected to the nozzle pipes 197 and 198, respectively. The pump 207 is driven by an electric motor 210.

A suitable sensing device 211 is connected to the second rinse tank 33 to sense a desired characteristic of the rinse solution, such as its pH. The sensing device 211 is connected to a suitable recorder, indicator or control device 212 which records or indicates the variations in such characteristic or which controls the operation of a pump 214 which causes a suitable chemical from the storage reservoir 215 to be introduced into the inlet conduit 217 to maintain such characteristic at a predetermined value.

Upon moving through the wringer assembly 190, the endless conveyor belts 35 and 36 pass over a direction changing roller 221 and separate immediately thereafter, the lower conveyor belt 36 then moving forwardly and about its driver roller 222, then downwardly between a stripper assembly 223 and a pair of wringer rollers 224 and 225 and then about the direction changing rollers 226, 227, 228, 228a, 229 and 230 back to roller 37. The upper belt 35 moves from the direction changing roller 221 upwardly and forwardly past the stripper assembly 231, and about its driver roller 232, and then forwardly past a tensioning roller 233, the direction changing rollers 234, 235, and 37 and then forwardly past the direction changing rollers 37a and 37b.

It will be apparent that the conveyor belts 35 and 36 are disposed in adjacent and material holding relationship through forwardly moving portions of their path of movement between the rollers 37 and 221 which extend through the wash and rinse tanks and that they separate after passing the direction changing roller 221. The portion of the path of movement of the lower conveyor belt between its rollers 230 and 37 constitute a loading area at which the material is laid in flat condition on the lower conveyor belt to be carried forwardly thereby into engagement with the upper conveyor belt at the roller 37.

The stripper assembly 223 includes a shaft 240 on which are rotatably mounted a plurality of rollers 241 each of which has radially outwardly projecting bristles 242 extending from an inner tubular core 243 through suitable radial apertures in the outer support sleeve 244 of the roller. The bristles are adapted to extend through the perforations of the endless conveyor belt 36 and thus strip off any adhering material therefrom to ensure that the material passes between the wringer rollers.

The shaft 240 extends through suitable aligned apertures in the lugs 250 whose threaded studs 251 extend through apertures in a tubular support bar 252 and are held in any adjusted position thereon by means of nuts 253. The tubular support bar may be formed of a plurality of telescoped sections 254 rigidly secured to one another in any suitable manner, as by set screws 255. The stripper rollers 241 are independently rotatable on the shaft 240. The support bar is rigidly secured to a supporting structure or frame of the apparatus in any suitable manner.

The stripper assembly 231 includes a shaft 260 on which a plurality of the stripper rollers 241 are rotatably mounted, the shaft being secured in any suitable manner to the support structure of the apparatus. The stripper assembly 231 strips off any material adhering to the upper conveyor belt and ensures that the material moves on the conveyor belt 36 to the wringer rollers.

A stripper assembly 278 includes a plurality of the stripper rollers 241 mounted on a shaft 279 secured to the supporting frame of the washer apparatus. The bristles of the stripper rollers are adjacent the lower wringer roller 225 and strip off therefrom any material adhering thereto as the stripper assembly is rotated in a clockwise direction.

A wiper blade or squeegee 300 made of rubber or the like extends the length of the lower wringer roller and contacts it to remove rinse solution which flows downwardly on the surface thereof as it is wrung from the material. The wiper blade is secured on a tubular support member 301 provided at its opposite ends with lugs 302 by means of which it is secured to the support frame of the washer machine. Guide rods 306 may be secured to the support member to guide the movement of the material to the dryer transport belt 350.

A drip receptacle 312 is disposed below the wiper blade and any solution wiped off the lower wringer roller falls onto deflection plate 313, flows thereover and through transverse slot 314 into the drip receptacle.

A conduit 315 is positioned at lowermost part of the drip receptacle and has apertures or slots through which the liquid in the receptacle may flow into the conduit. The conduit transports the water from the drip receptacle to a waste line or back into the second rinse tank 33 by a suitable conduit, not shown.

The lower wringer roller 225 is mounted for upward movement toward the upper wringer roller and is biased toward the upper roller so that the material after moving off the lower conveyor belt is again compressed or wrung to remove moisture therefrom. It will now be seen that the material which is to be cleaned by the washing apparatus 30 is placed on the lower conveyor belt as it moves forwardly in the loading portion of its path of movement between the rollers 230 and 37. As the material is moved on the lower conveyor belt forwardly toward the direction changing roller 37, it is engaged by the upper conveyor belt 35 and is held between and by the conveyor belts and moved thereby into the wash tank past the two nozzle assemblies 38 and 39 which direct jet streams of the wash solution from the wash tank 31 at opposite sides of the material at vertically spaced locations in the path of movement of the material and the belts in the wash tank, then through the turbulent wash solution, upwardly past the nozzle assemblies 53 and 54 which direct jet streams of the wash solution at opposite sides of the material at vertically spaced locations in the path of movement of the belts whereby the wash solution thoroughly circulates through the material, the insoluble soil particles are mechanically separated from the material by the force of the high velocity jet streams soluble soil is dissolved and carried away by the wash solution, and stains in the material are bleached into colorless compositions during the movement of the material through the wash tank.

As the material carried by the belt moves upwardly from the uppermost nozzle assembly 54, it passes between the rollers 121 and 122 of the wringer 120 which compresses or squeezes the belts and the material carried therebetween to cause a large portion of the wash solution carried in the material and on the belts to be wrung therefrom and returned back into the wash tank.

After passing through the wringer assembly 120, the material is carried past the rinse nozzle assembly 126 which directs a jet spray of the first rinse solution at one side of the material, through the rinse solution, about the direction changing roller 125 and then past the nozzle assembly 132 which directs a jet stream of the first rinse solution to the other side of the material. During the passage of the material through the first rinse tank, any wash solution absorbed or carried thereby is replaced by the first rinse solution. After moving past the second jet stream nozzle assembly 132, the material moves between rollers 134 and 135 of the wringer assembly 133 which compresses or squeezes the material and the belts to remove substantially all of the first rinse solution from the material and belts.

The material is then carried by the belts past the nozzle assembly 184 which directs a stream of the second rinse solution to one side of the material, through the second rinse solution as the washed material moves about the direction changing roller 181 and then past the second nozzle assembly 194 which directs a jet stream of the second rinse solution at the other side of the material. Any of the first rinse solution absorbed or carried by the material and the belts is then replaced by the second rinse solution. Since fresh water is being continuously introduced into the second rinse tank, the second rinse solution at all times contains a minimum concentration of any of the active agents of the wash solution so that the material as it moved toward the wringer rollers 191 and 192 of the last wringer assembly 190 has relatively none of the active agents of the wash solution absorbed or carried thereby. The wringer assembly 190 compresses the material and the belts and removes substantially all of the second rinse solution carried by the material and the belts therefrom which drains back into the second rinse tank.

After the material is carried past the direction changing roller 221, the stripper assembly 231 separates the material from the upper belt 35, as the two conveyor belts diverge during their continued forward movement, and insures that the material remains on the lower conveyor belt 36 and is moved with the lower conveyor belt over the drive roller 222 thereof and pass the upper wringer roller 224. The stripper assembly 223 causes the material to be separated from the conveyor belt 36 and moved between the wringer rollers 224 and 225. The lower wringer roller is biased upward toward the upper roller and this compresses the material and wrings or squeezes substantially all of the moisture therefrom. The material is then moved by the lower wringer roller to the conveyor belt 350 of the dryer 352. The stripper assembly 278 strips off any material which tends to adhere to the lower wringer roller.

The second rinse solution continuously flows from the second rinse tank into the first rinse tank thus providing for economy in the use of the water and fuel since the overflow or excess of the heated rinse solution from the first rinse tank passes through the heat exchanger 170 wherein the heat from the overflow is transferred to the water which is continuously flowing into the second rinse tank through the conduit 166 to preheat such water. The second rinse solution is thus easily maintained at the desired high temperature, for example 180 degrees, and the costs of heating the rinse solution are minimized.

It will be seen that the continuous circulation of the wash and rinse solutions at high velocities ensures that the material is thoroughly wetted and penetrated by the wash and rinse solutions as it moves past the nozzle assemblies.

It will further be seen that the continuous rapid circulation of the wash and rinse solutions maintains these solutions in very turbulent condition, the entire volume of the solution in each tank for example being circulated through its nozzle assemblies in the order of once every minute, so that these solutions are continuously and rapidly circulated through the material as it moves through each tank thus facilitating the washing and rinsing thereof.

It will also be apparent that since the conveyor belts are moved at a very high rate of speed, for example, 100 ft. per minute and the wash and rinse solutions are maintained at a high temperature, for example, 180 degrees Fahrenheit, the material and any moisture still absorbed or carried thereby are at substantially this high temperature when the material is deposited in the dryer conveyor belt whereby excess water in the material is more quickly evaporated therefrom as the material is moved through the dryer since its temperature need be raised only some 32 degrees Fahrenheit and the length of travel of the material through the dryer at the high speed of one hundred feet per minute can be quite short thus permitting the use of a dryer of relatively small dimensions.

The support frame 360 of the washing apparatus includes a rectangular base 361 formed of I-beams or the like and supported on a floor or other support surface by the means of the adjustable feet 362. The support structure includes a plurality of vertical members 363 and a top frame 364 secured to the upper ends of the vertical members. The vertical frame members are spaced longitudinally along each side of the structure and on opposite ends of the three wash tanks. The vertical members are rigidly secured to the base, to the top frame and to the tanks as by welding.

Figure 4:
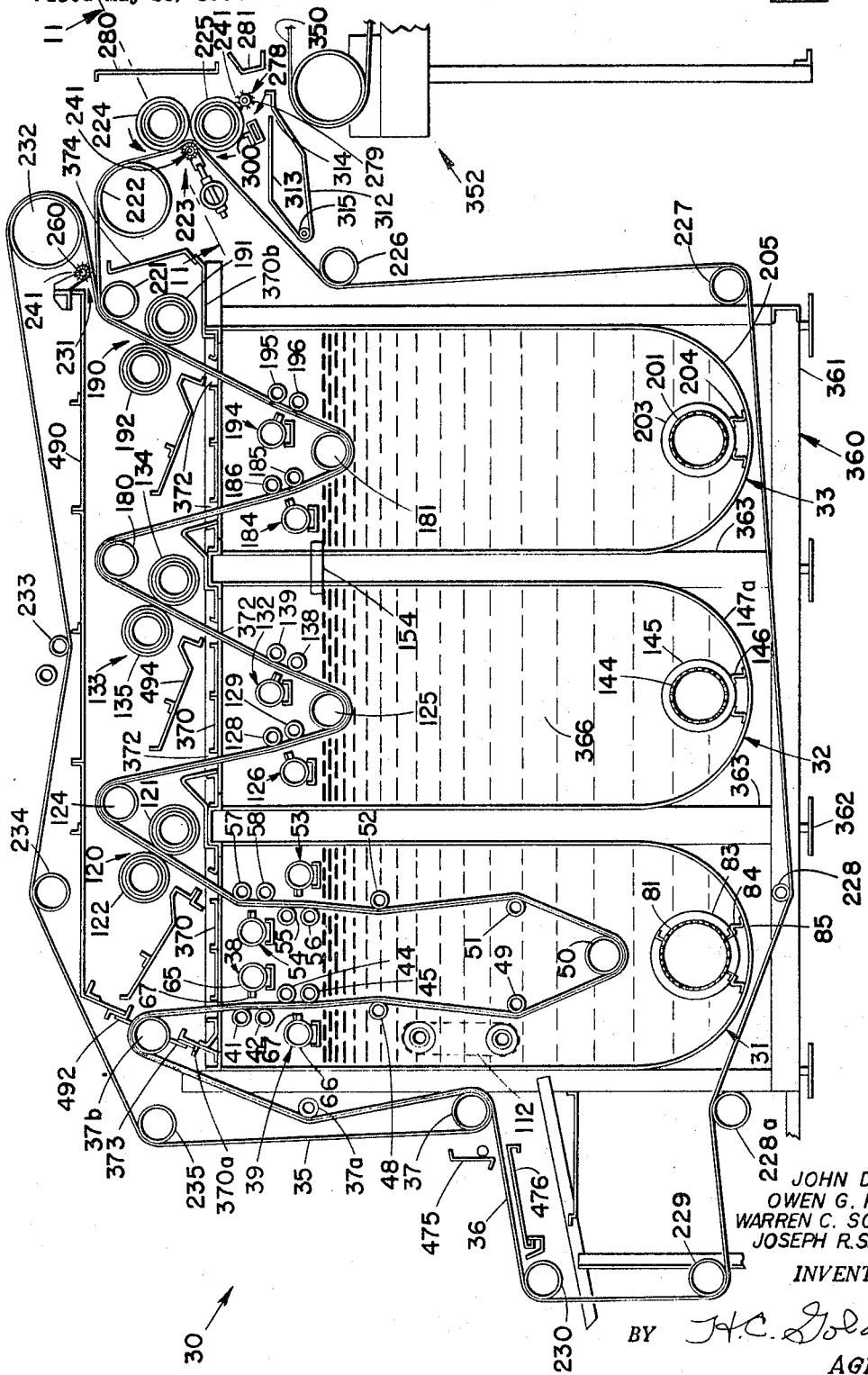
FIGURE 4 is a vertical schematic sectional view through the washing apparatus.
Figure 5:
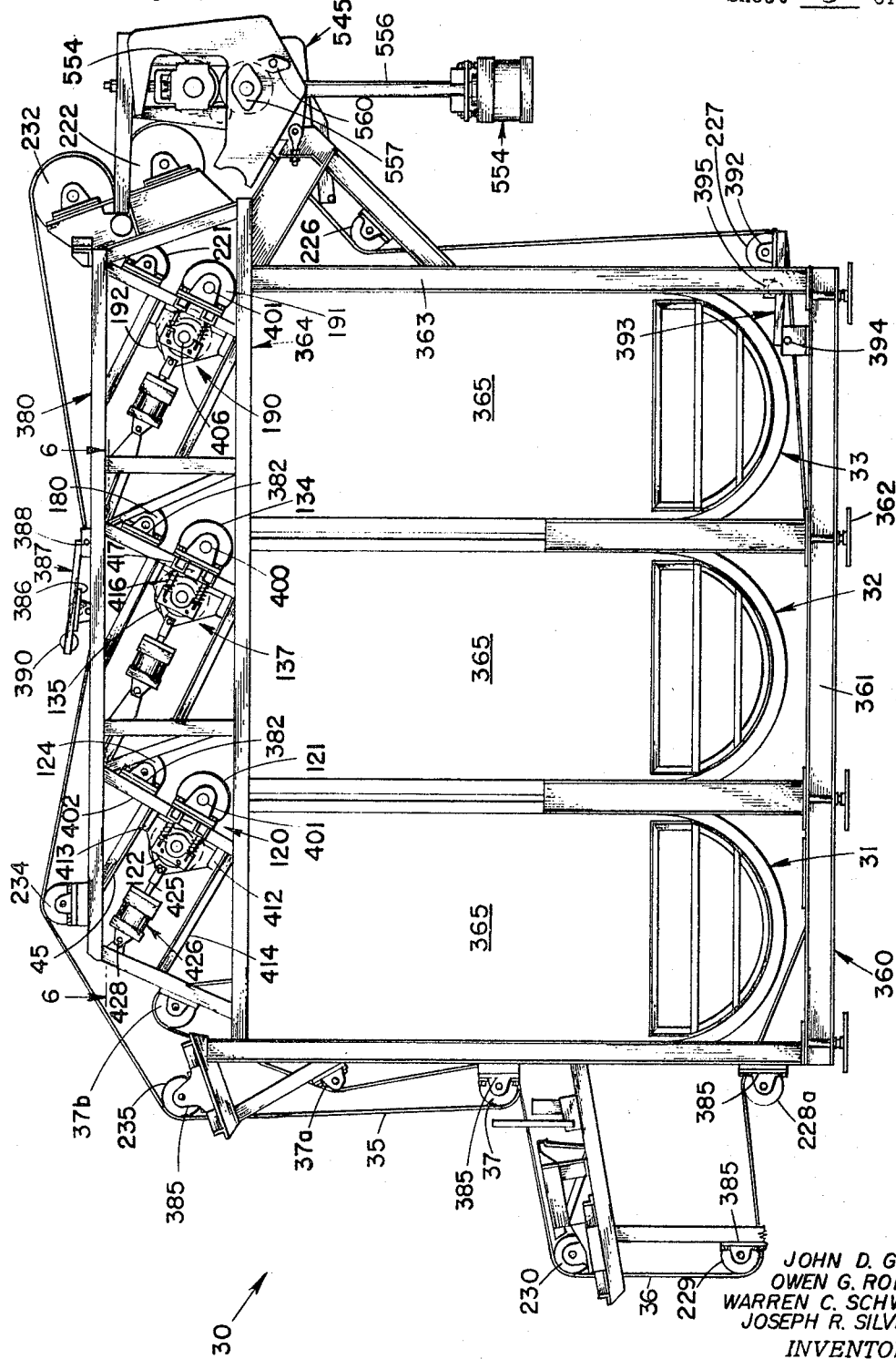
FIGURE 5 is a side view of the washing apparatus.
Figure 6:
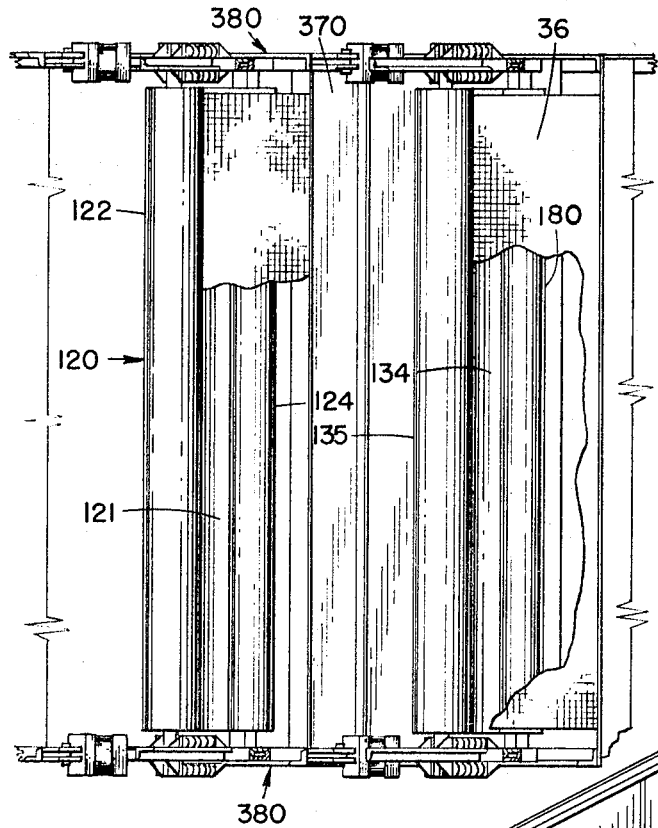
FIGURE 6 is a fragmentary horizontal sectional view, with some parts broken away, taken on line 6—6 of FIGURE 5.
Figure 7:
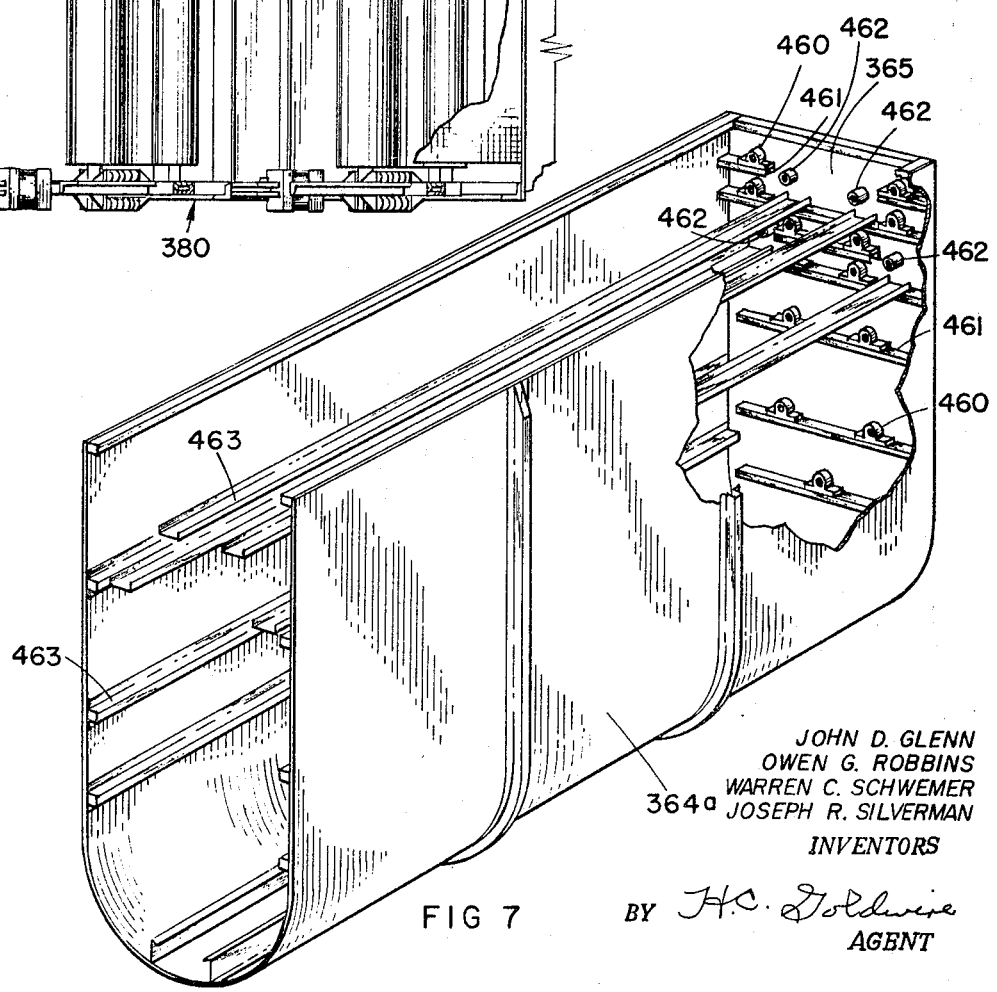
FIGURE 7 is a perspective view, with some parts re-moved, of one of the wash tanks of the washing apparatus.
Figure 8:
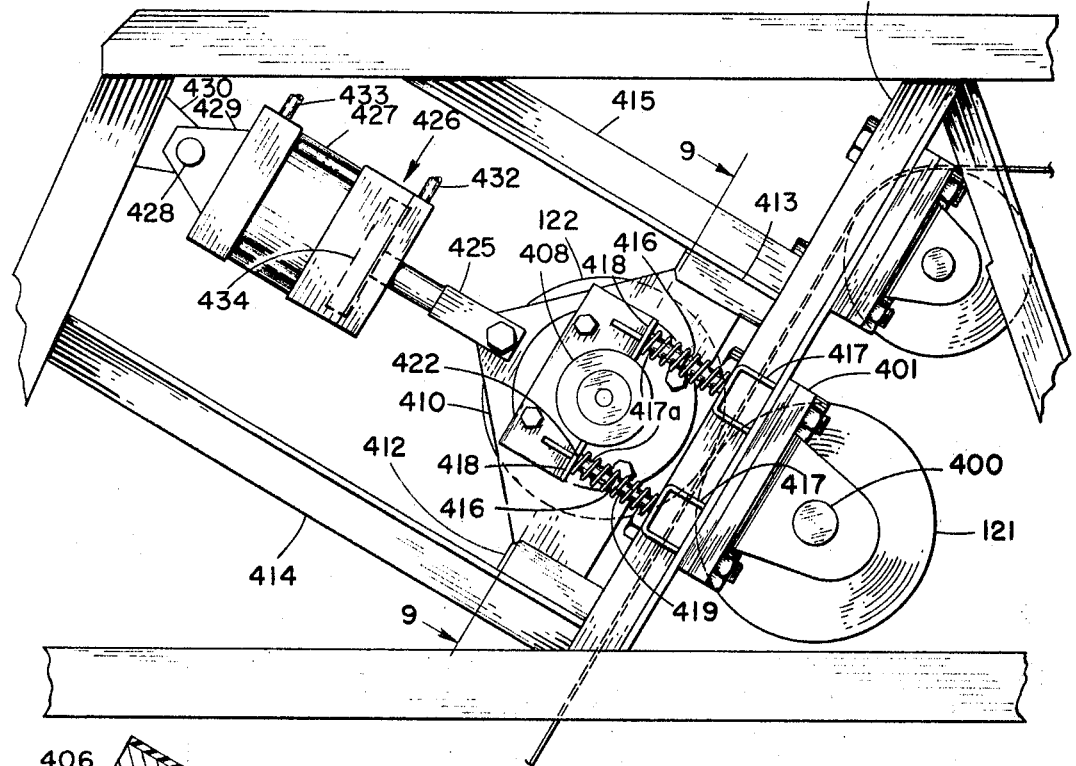
FIGURE 8 is a fragmentary side view of the wringer assembly of the washing apparatus.
Figure 9:
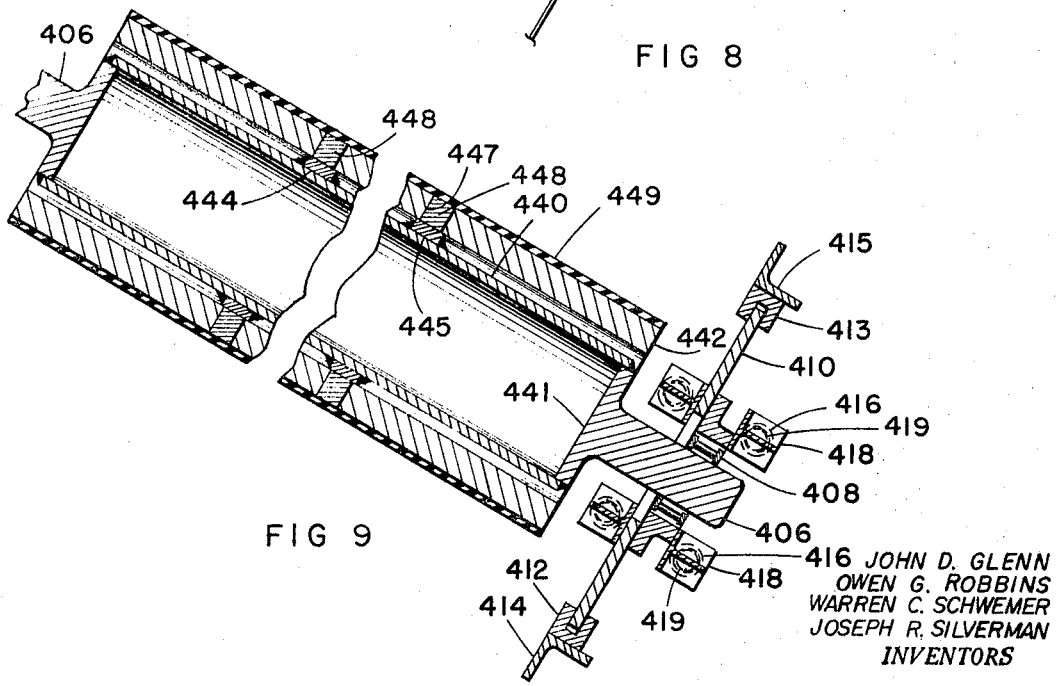
FIGURE 9 is a fragmentary sectional view taken on line 9—9 of FIGURE 8.

Each of the tanks is of open top construction, its transverse sides and bottom being formed of a single sheet 364a of metal to which the end walls 366 and 365 are connected. The upper ends of the tank are closed by cover plates 370 rigidly secured to the top frame 364 as by bolts or the like. The cover members are spaced to provide transverse slots 372 through which the conveyor belts move into and out of the tanks. The cover member 370a (FIG. 4) at the region of entry of the belt into the wash tank may be provided with a transverse contact blade 373 of rubber or the like which engages the lower surface of the direction changing roller 37b while the end cover member 370b at the rear end of the second rinse tank 33 is provided with the transverse plate 374 which extends between the drive roller 222 and the direction changing roller 221. A pair of side truss frame 380 extend lengthwise on opposite ends of the tank and are rigidly secured to the top frame 364. Transversely aligned pairs of pillow blocks 382 secured to the two side truss frames rotatably support the shafts of the rollers 37b, 124, 180, 222, 232, and 221. The direction changing rollers 226, 228, 228a, 229, 230, 37, 37a and 235 have their shafts rotatably mounted in transversely aligned pairs of pillow blocks 385 connected to the supporting frame at suitable locations. The tensioning roller 233 of the top conveyor belt is rotatably journaled in pillow blocks 386 mounted on a pivot frame 387 whose forward end is pivotally secured as by the shafts 388 to the side truss frames. The pivot frame has suitable weight 390 secured thereto which biases the frame and therefore the tensioning roller 233 downwardly and maintains the upper conveyor belt is under proper tension. The lower conveyor belt maintained under tension by the roller 227 whose opposite end shafts are rotatably supported by the pilow blocks 392 mounted on one end of a pivot frame 393 whose other end is pivotally secured to the support structure by suitable shafts, as at 394. A weight 395 secured to the pivot frame biases the frame downwardly and the lower belt is thus maintained under suitable tension.

The lower wringer roller of each of the wringer assembies 120, 133 and 190 has its oppoiste end shafts 400 rotatably mounted in a transversely aligned pair of pillow blocks 401 secured to the angular upwardly and forwardly extending angle members 402 of the side truss frames. The opposite end shafts 406 of the upper roller of each wringer assemby are rotatably mounted in suitable bearings 408 carried by slide plates 410. Opposite lower and upper edge portions of each slide plate are slidable in the grooves of the lower and upper channel guides 412 and 413 rigidly secured to the upwardly and rearwardly inclined angle members 414 and 415, respectively, of the side frames so that the top roller of each wringer assembly is movable toward and away from its associated lower roller.

The slide plate 410 is biased upwardly and rearwardly by springs 416 whose lower ends bear against brackets 417 rigidly secured as by welding to the side truss frame member 402 and whose upper ends bear against the laterally outwardly extending lugs 418 rigidly secured to the slide plate 410.

The springs are disposed about the lower guide pins 419 whose lower ends are rigidly secured to the brackets 417 and the upper guide pins 417a whose upper ends are rigidly affixed to the lugs 418. The confronting ends of the pins 417 and 417a are sufficiently widely spaced to allow contact between the rollers 121 and 122 when the roller 120 is moved toward the roller 121.

Each slide plate is connected to a piston rod 425 of a pneumatic ram 426 whose cylinder 427 is connected to the side frame by a bolt 428 or the like which extends through suitable aligned apertures in the cylinder lug 429 and a lug 430 of the side truss frame. It will be apparent that when fluid under pressure from a suitable source is admitted into the cylinders of a top roller through the fittings 433 while at the same time the cylinders are vented through the fittings 432, the piston 434 is moved toward its extended position and moves the upper roller toward the lower roller, against the resistance of the springs 416, and that when the fittings 433 are vented, the force of the springs moves the upper roller away from the lower roller.

When the washing machine apparatus is in operation, fluid under pressure is introduced into each ram cylinder through its upper fitting 433 while the lower fitting 432 is vented so that the upper roller of each wringer assembly is biased with a predetermined force toward the lower wringer roller and, whenever the washing apparatus is inoperative, the fitting 433 is vented and the force of the springs 416 moves the upper roller away out of engagement with its associated lower roller. It will be apparent that the top roller is thus free to move to a certain degree away from the lower roller, against the force of the fluid pressure tranmitted to the rams of its slide plates, to accommodate material of different thicknesses which may be moved between the rollers as the conveyor belts move therebetween.

The two wringer rollers of the wringer assemblies are identical in structure. Each wringer roller includes a central cylinder 440 to whose opposite ends are secured the disks 441 of the end shafts 406. The outer cylinder 442 of the roller extends about the inner cylinder and is held in spaced relationship thereto by a pair of spacing or load rings 444 and 445 rigidly secured, as by welding, to the inner cylinder. The outer cylinder is provided with weld holes 447 which are aligned with the spacer rings 444 and 445 and through which welds 448 may be made to rigidly secure the outer cylinder to the load rings. The two load rings 444 and 445 are positioned intermediate the ends of the ends of the inner and outer cylinders, e.g., one-fifth to one-fourth the distance from the ends thereof. The loads imposed on the outer cylinders by the material are thans transferred to the inner cylinders at points spaced inwardly of the ends whereby the deflection of the wringer rollers is minimized.

It will be apparent that if each roller had merely one cylinde connected to the shafts at the ends thereof, such cylinder would then tend to deflect intermediate its ends to a much greater degree as the material passed between rollers. The outer cylinder is provided with a thin coating or cover 449 of a relatively soft resilient substance, such as rubber. The full width of the materials are subjected to a substantially constant equal wringing or compressive force throughout the transverse line or area of contact of the rollers with the conveyor belts so that all portions of the material are compressed with substantially the same force and are uniformly freed of moisture by the wringer assembly.

The support and direction changing rollers mounted in the tanks have end shafts which are receivable in the pillow blocks 460 mounted on the channel members 461 rigidly secured to the end walls 365 and 366 of the tanks. The pipes of the nozzle assemblies are provided with end sockets in which are receivable the studs 462 mounted the end walls 365 of the tanks.

Reinforcing channel member 463 may extend between the end walls of the tanks. Each nozzle pipe extends through a suitable aperture 464 in the end wall 366 of its tank and is provided with an end retainer flange 465 secured thereto by suitable bolts which extend through aligned apertures in the retainer flange 465, and such end wall 366. A suitable gasket or other seal means in interposed between the retainer flange and the side wall to prevent fluid flow therebetween.

The strainer of each of the two rinse tanks extends across its tank and in covering relation to the rinse pump inlet through a suitable aperture 468 in one side wall of its tank and is secured thereto by means of its end flange 469 and bolts. The strainer 81 of the wash tank opens into the manifold 62 secured to the side wall 366 of the wash tank. The conduits 60 and 72 extend into the apertures 471 and 472 of the manifold and are rigidly secured thereto in fluid tight relationship by any suitable means.

The support frame includes a transverse shield plate 475 which extends in front of the direction changing roller 37 and a transversely extending support plate 476 positioned below the horizontal loading portion of the path of movement of the lower conveyor belt between the direction changing rollers 230 and 37 to limit downward deflection of the lower conveyor belt at this location. Forward shield plates 280 and 281 are secured to fixed structure of the dryer. A flexible wiper blade 492 mounted on the side truss frame in any suitable manner engages the upper belt 35 as it passes over the direction changing roller 37b thus preventing any fluid or spray from moving rearwardly therebetween.

The forwardly and downwardly inclined splash guards 494 extend below each upper roller of each wringer assembly, their opposite ends being secured to the side truss frames of the support frame to help direct the wash and rinse solutions wrung out of the belts and the material back into the tanks.

Figure 12:
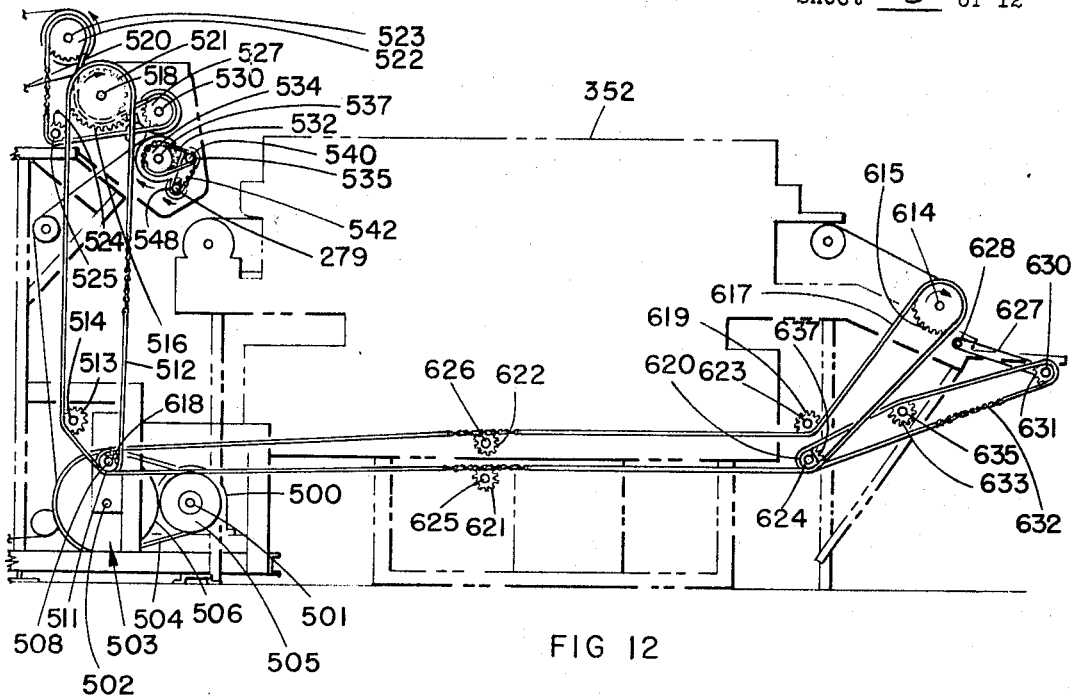
FIGURE 12 is a diagrammatic side view of the transmission means for simultaneously driving the conveyor belts of the washing apparatus and of the dryer.
Figure 10:
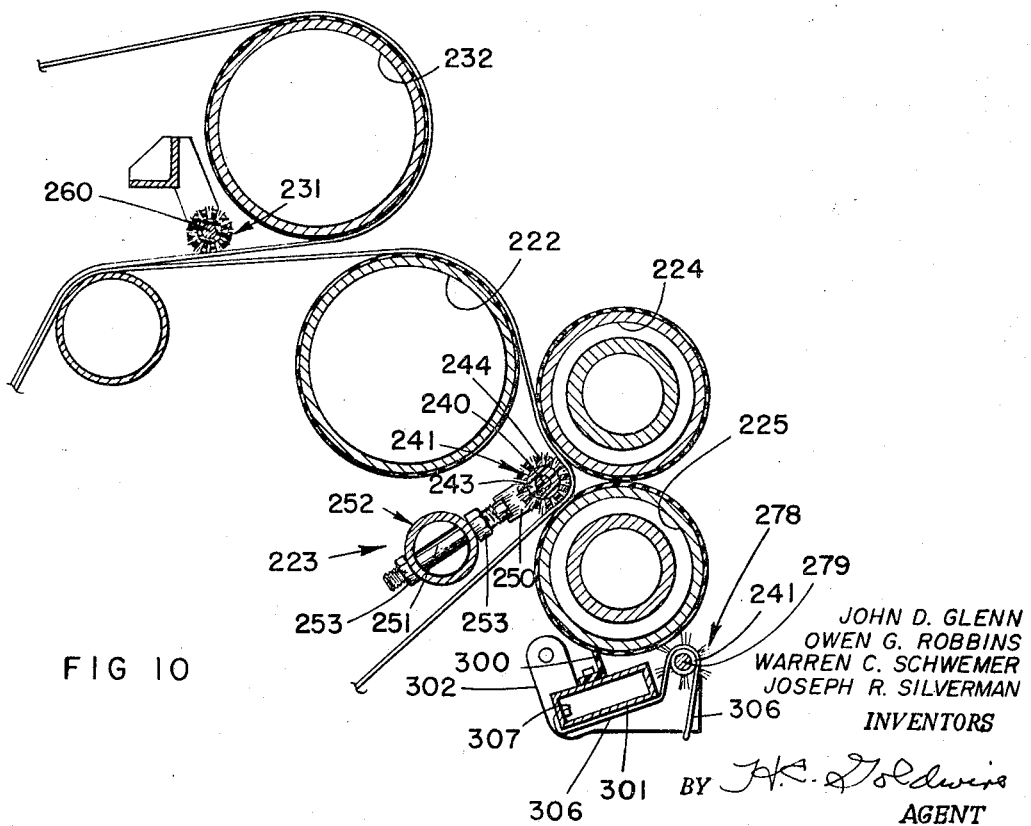
FIGURE 10 is a fragmentary sectional view of the stripper and transfer assemblies for stripping material from the perforate belts of the washing apparatus, wringing the material and transferring it to the transport belt of the dryer.

The driver rollers 222 and 232 of the belts 36 and 35, respectively, the wringer rollers 224 and 225 and the stripper 278 are rotated by an electric motor 500 whose drive shaft 501 is connected to the input shaft 502 of a speed reducing transmission 503 by means of a belt 504 which extends about the pulleys 505 and 506 rigidly secured to the shafts 501 and 502, respectively. The output shaft 508 of the speed reducing transmission 503 has a sprocket 511 rigid therewith and an endless chain 512 extends about the sprocket 511, the direction changing idler sprocket 513 rotatably mounted on a shaft 514 rigidly secured in any suitable manner to the support frame of the washing apparatus and the sprocket 516 rigidly connected to the shaft 518 of the driver roller 222. An endless chain 520 extends about a sprocket 521 also rigidly secured to the shaft 518, the sprocket 522 rigidly connected to the shaft 523 of the driver roller 232, a direction changing idler sprocket 524 rotatably mounted on a suitable shaft 525 mounted in any suitable manner on the support frame, and a sprocket 527 rigidly secured to the shaft 530 of the upper wringer roller 224. It will be apparent that when the output shaft 508 of the speed reducing transmission 503 is rotated in a clockwise direction FIGURE 12, the driver roller 232 is rotated in a counter clockwise direction. The driver roller 225 is rotated in a clockwise direction and the upper wringer roller 224 is rotated in a counter clockwise direction. The lower wringer roller 225 frictionally engages the upper wringer roller and material passing therebetween and is therefore rotated in a clockwise direction when the upper wringer roller is rotated. An endless chain 532 extends about the sprockets 534 and 535 rigidly secured to the shaft 537 of the lower wringer roller 225 and a shaft 540 respectively. The shaft 540 has a second sprocket 541 and an endless chain 542 extending about the sprocket 541 and a second sprocket 543 rigid with the shaft 279 of the stripper 278.

It will now be apparent that the ratios of the various sprockets are so chosen that the peripheral speeds of the drive rollers 222 and 232 and of the two transfer or wringer rollers 224 and 225 are equal so that the two conveyor belts are moved simultaneously and at the same speed and so that the material is moved by the wringer rollers 224 and 225 at a slightly greater speed than it is moved by the conveyor belts, and in the directions indicated by the arrows. The greater speed of the ringer rollers enables them to pull folds and wrinkles from the washed material as it is removed from the conveyor belts.

The opposite ends of the shaft 530 of the top wringer roller 224 are each supported by a bearing block 544 vertically adjustably secured to a bearing frame 545 rigid with support frame of the washer apparatus by means of a threaded stud 546 which extends through a suitable aperture in the top member 547 of the bearing frame and the nuts 548 disposed above and below the top member. The bearing block has vertical grooves 549 in its opposite sides in which are received the inner edge portions of the spaced vertical frame members 550 of the bearing frame.

The opposite ends of the shaft 537 of the lower wringer roller 225 are each rotatably supported in a bearing block 551 slidably mounted on the bearing frame 545 by means of its vertical grooves 552. Each bearing block 551 is connected to the piston rod 553 of a pneumatic or hydraulic ram 554. The cylinder 555 of the ram is rigidly secured to the block 555a of the bearing plate by means of the guide sleeve 556 rigidly secured to the cylinder and the block 555a. The piston rod extends through the guide sleeve.

Each end of the shaft 537 also extends outwardly through a bearing 557 secured to a slide plate 558 vertically slidable mounted on its adjacent bearing frame 545 by means of the grooves 559 in which the inner edge portions of the frame members 550 are receivable. Each end of the stripper shaft 279 is supported by a bearing 560 secured to each slide plate. The shaft 540 on which the sprockets 535 and 541 are mounted rotatably on one of the slide plates, by means of a suitable bearing, not shown secured to such slide plate.

It will be apparent that when fluid under pressure is introduced through the inlets 563 of the cylinders of the rams 554 at opposite sides of the washing apparatus the bottom ringer roller 225 is biased upwardly into engagement with the top wringer 224 to compress or wrings material moved therebetween. The slide plates 558 which move with the bottom wringer roller support the stripper 278 so that the stripper bristles are always held in operative engagement with the bottom wringer roller.

The dryer 352 includes a housing 565 which provides a closed air flow path 566 through which air is circulated by a centrifugal blower 567 positioned in the housing below the conveyor belt 350 which causes gas to be circulated downwardly through the foraminous screen conveyor belt 350, then past a burner 567a which heats the air and back to the conveyor belt 350. A vent duct 568 opens to the housing between the blower and the burner to permit controlled venting of the passage and has a suitable damper or valve means 569, for controlling the internal pressure of the dryer to a pressure slightly above that of the atmosphere. A bypass valve 570 hingedly connected to the housing as at 571, closes a side opening 572, downstream of the burner, which opens into the region below the upper portion of the dryer conveyor belt.

It will be apparent that by the amount of gas being circulated downwardly through the material on the conveyor belt may be controlled by the valve 570, it being apparent that when the damper valve 570 is open a portion of the air being circulated by the blower 567 will flow through the side opening so that a smaller percentage of the air, and therefore of lower velocity, will circulate downwardly through the conveyor belt 350.

The gas burner continuously introduces hot gases into the closed flow path 566 so that a portion of the gases flowing in the housing must continuously escape from the closed flow path through the vent duct 568.

The conveyor belt extends about a driver roller 575 and a direction changing roller 576 disposed on opposite sides of the flow path. The conveyor belt in its upper horizontal path of movement through the flow passage is supported by a plurality of support rollers 577 which extend through the flow path and are suitably rotatably mounted in the housing and in its lower path of movement through the flow passage by the rollers 579, similarly mounted in the housing. The conveyor belt also extends about the direction changing rollers 580, 581 and 582 disposed between the housing and the driver roller 575.

The dryer conveyor moves into one side of the housing through an upper rear transverse slot or opening 585 and over a transversely extending slide and support plate 586 of the housing as it moves forwardly from the direction changing roller. A flexible flap 587 whose upper edge portion is secured to the housing defines the upper end of the transverse slot. The conveyor belt moves forwardly out of the housing through an upper forward transverse slot 590 whose lower end is defined by a transverse slide and support plate 591. A plate 592 defines the upper end of the rear transverse opening 590. The belt when moving rearwardly in its lower course of movement from the direction changing roller 580 moves into the housing through a lower forward transverse slot 594 whose lower end is defined by support and slide plate 596 the upper edge of the slot being defined by a flexible flap 597 secured to the housing. The conveyor belt moves rearwardly from the housing through lower rear slot 599 whose lower surface is defined by support and slide plate 600 and whose upper edge is defined by a flexible flap 602.

A centrifugal blower 567 is rigidly secured to the upper end of the output shaft 605 of a suitable speed reducing transmission 606 driven by the drive shaft 608 of an electric motor 609. The transmission and the motor are mounted on a suitable support frame 610 of the dryer.

The shaft 614 of the dryer conveyor drive roller 575 is rotatably mounted in a suitable bearing means not shown, mounted on the frame 610 of the dryer and has a sprocket 615 rigidly secured thereto. An endless chain 617 extends about the sprocket 615 and a sprocket 618 rigidly secured to the output shaft 508 of the speed reducing transmission 503 and about the direction changing sprockets 619, 620, 621 and 622 rotatably mounted rigidly secured to the shafts 623, 624, 625 and 626 respectively, suitably rotatably mounted by suitable bearing blocks on the support frame of the dryer. The ratios of the sprockets 615 and the sprocket 618 are so chosen that the dryer conveyor belt is moved at a slightly greater speed than the speed of movement of the wringer rollers. The difference in speed prevents pleating in the downwardly moving material and stretching of large articles (sheets, etc.) so that they lie smoothly on the dryer conveyor belt.

The dryer may also include a transfer conveyor 627 on to which the dried material moves as it moves off the forward end of the path of movement the dryer conveyor belt. The transfer conveyor may extend about an idler roller 628 and a drive roller 629 rotatably mounted on the dryer support frame. The shaft 630 of the drive roller 629 has a sprocket 631 about which extends a chain 632 which also extends about the idler sprocket 633 mounted on a shaft 635 and a sprocket 637 rigidly secured to the shaft 624. The transfer conveyor belt 627 is also moved at the same or slightly greater speed as the dryer conveyor belt.

It will now be seen that as the material moves off the lower wringer roller 225 it moves onto the dryer conveyor belt at the rear upper portion of its path of movement and is carried thereby into the dryer housing through the upper rear slot 585. The hot gas whose temperature is substantially higher than 212 degrees Fahrenheit is circulated down through the material to evaporate and carry off any remaining moisture therefrom as the material moves through the dryer. The downward passage of the hot gases through the cloth forces the cloth against the belt surface, which is substantially smooth, and thus imparts to the cloth a surface finish similar to that of the belt and akin to the smoothness produced by an ironer. The dried material moves out of the dryer housing through the upper forward aperture 590 and then falls off the conveyor belt 350 as the conveyor belt moves about the driver roller 575 onto the transfer conveyor 627 which then carries it to a folding table, a folding device, or the like.

To obtain the ironing action previously described it is essential that the dryer conveyor belt have a smooth surface. In addition to this requirement, it is necessary that the belt present a resistance to the flow of the hot drying gas that is similar to the resistance of the articles to be dried. It has been found that for 75% coverage of the belt by the material to be dried, a flow resistance equivalent to that of perforated sheet metal having 6% to 10% effective orifice per unit area and preferably 8% is required.

If this requirement is not met, the drying gas will preferentially flow through the area of the belt not covered by the articles to be dried and there will be little flow through the articles and hence no drying will occur. When the belt resistance is of the same order as that of the article to be dried, the flow will be proportioniated between the articles and the open belt according to the proportion of the belt covered by the articles to be dried.

To obtain a foraminous belt having this flow resistance and the desired smooth surface, a metal wire mesh belt of Fourdrinier specification is sprayed with an alloy or mixture of zinc and brass to a degree necessary to reduce the effective orifice of the belt per unit area to between 6% and 10% of the unit area.

Since the burner, which may be of the gas type to which air and a fuel gas are supplied through suitable conduits, not shown, continuously introduces hot gases into the closed flow path 566 of the dryer, gases must escape from the housing at the same rate they are being introduced thereunto, through the vent duct 568. The rate of flow of the hot gases through the material as it moves through may be controlled by varying the effective area of side opening 572 by adjusting its valve 570, it being apparent that the velocity of flow through the material must be varied depending on the weight and other characteristics of the material being dried. The rate of flow may also be controlled of course by varying the speed of rotation of the blower 567. It is however more economical to provide the valve 570 than to provide either a variable speed motor or a variable speed transmission for the blower.

The material as it moves very rapidly through the washing apparatus and through the dryer is heated to and maintained at a relatively high temperature to facilitate the washing action of the wash solution, the rinsing action of the rinse solution and the subsequent drying of the material. The material and the moisture absorbed thereby are at a high temperature as the material is moved into the dryer housing since its rate of movement is very great, for example one hundred feet per minute and it does not have time to cool off while passing from the washing apparatus to the conveyor belt of the dryer. Any remaining moisture in the material is very quickly evaporated in the dryer and the amount of heat necessary to cause such evaporation is relatively small and the length of path of travel and the length of time that the material must be subjected to the hot gas in the dryer is also relatively short.

It will now be seen that a new and improved washing apparatus has been illustrated and described which permits the material to be moved continuously at a high rate of speed and that the conveyor means of the washing apparatus and the dryer apparatus are driven by a single drive means thereby obviating the need for any speed synchronizing devices.

It will further be seen that the high speed of rate of movement through the washing apparatus and the dryer permits a most efficient utilization of the washing apparatus and a most efficient utilization of energy necessary to heat, wash and rinse solutions and to dry the washed material.

FIGURE 16 of the drawings illustrates the manner in which a conveyor belt of the washing apparatus, for example, the conveyor belt 36 may be moved away by the force of the jet stream emanating from a nozzle assembly, for example, the nozzle assembly 38, and impinging on material disposed between the belts 35 and 36, if the support means, for example, rollers 41 and 42, are spaced too far apart. The effectiveness of the jet stream whether, it be of wash liquid or rinse liquid, is decreased due to the fact that the farther away the material is from the nozzles of the nozzle assembly, the lesser is the velocity of the jet stream and the greater is the dispersion of the jet stream into droplets. In order to prevent such displacement of the material and the belt 36, the rollers 41 and 42 may be rigidly secured to the fixed structure of the apertures and have secured thereto slide plates 600 and 601, respectively. The slide plates may be of substantially right angular configuration having adjacent horizontal legs 603 and 604 and vertical legs 605 and 606, respectively which extend perpendicularly from the horizontal legs. The vertical legs 605 and 606 may be provided with flanges 608 which extend angularly away from the nozzle assembly to facilitate movement of the belt 36 thereagainst.

It will be apparent that the distance between the horizontal legs 603 and 604 is much smaller than the distance between the tangential lines of contact of the belt 36 with the rollers 41 and 42 and the slide plates permit the conveyor belt 36 to be held against displacement away from the nozzle assembly 38, especially when the material is being transported by the conveyor belts pass the nozzle assembly 38, by the force of the jet stream emanating from the nozzle assembly 38.

It will be apparent that while the slide plates have been shown as rigidly secured to the support rollers 41 and 42, as by welding, the slide plates can be rigidly secured to the fixed structure of the washing apparatus by any other suitable members or means.

The apparatus is, of course, provided with suitable well known means for maintaining the various conveyor and transport belts properly positioned relative to the drive and other rollers over which they pass so that the belts will not move off the rollers.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An apparatus for washing soiled material including; a wash tank; a plurality of rinse tanks; a pair of foraminous belt means for moving soiled materials in a flat condition therebetween sequentially through said wash tank and said rinse tanks; a pair of nozzle means disposed on opposite sides of said belt means and above a liquid in each of said tanks; means for circulating a wash liquid from said wash tank to the pair of nozzle means associated with the wash tank for directing vertically spaced substantially horizontal jet streams of wash liquid to opposite sides of the material prior to its movement into the wash liquid in said wash tank, each of said rinse tanks having means for circulating a rinse liquid from each rinse tank to the nozzle means associated with each rinse tank for directing vertically spaced substantially horizontal jet streams of rinse liquid to opposite sides of the material; means for removing liquids from the material prior to the movement of the material from each of said tanks, said liquid removing means comprising a pair of wringer rollers between which the belt means moves, said rollers compressing the material carried thereby; and stripper means for separating the material from said belt means after said belt means move said material past the liquid removing means of the last of said rinse tanks, one of said stripper means comprising roller means over which one of said belt means moves, said roller means having means extendable through openings of said foraminous belt means and engagable with material carried by the belt means to free the material from the belt means.

2. An apparatus for washing soiled material including: a wash tank; a plurality of rinse tanks; a pair of foraminous belt means for moving soiled materials in a flat condition therebetween sequentially through said wash tank and said rinse tanks and below a normal top liquid level of each of said wash tanks to which each tank is adapted to be filled with a liquid; a pair of nozzle means disposed in each of said tanks on opposite sides of said belt means and above the top liquid level of each of the tanks; means for circulating a wash liquid from said wash tank to the pair of nozzle means associated with the wash tank for directing vertically spaced substantially horizontal jet streams of wash liquid to opposite sides of the material during its movement above the top liquid level of the wash tank, each of said rinse tanks having means for circulating a rinse liquid from each rinse tank to the nozzle means associated with each rinse tank for directing vertically spaced substantially horizontal jet streams of rinse liquid to opposite sides of the material during the movement of the material above the top liquid levels of the rinse tanks; means for removing liquid from the material prior to the movement of the material from each of said tanks, said liquid removing means comprising a pair of wringer rollers between which the belt means move, said rollers compressing the material carried thereby; and stripper means for separating the material from said belt means after said belt means move the material past the liquid removing means of the last of said rinse tanks, one of said stripper means comprising roller means over which one of said belt means moves, said roller means having means extendable through openings of said foraminous belt means and engageable with material carried by the belt means to free the material from the belt means.

3. The apparatus of claim 2, and another pair of nozzle means disposed in said wash tank on opposite sides of said belt means and above the top liquid level of said wash tank; means for circulating a wash liquid from said wash tank to said second pair of nozzle means for directing vertically spaced substantially horizontal jet streams of wash liquid to opposite sides of the material during its movement above the top liquid level of said wash tank, one of said pair of nozzle means of said wash tank directing jet streams of wash liquid to opposite sides of the material during its downward movement to the top liquid level of said wash tank and the other of said pair of nozzle means in said wash tank directing jet streams of wash liquid to opposite sides of the material during its upward movement from the top liquid level of the wash tank.

References Cited

UNITED STATES PATENTS

| 160,743 | 3/1875 | Barker | 68—22 |
|---|---|---|---|
| 644,498 | 2/1900 | Cook | 68—9 X |
| 2,064,512 | 12/1936 | Wilson et al. | 68—9 |
| 2,294,141 | 8/1942 | Trimble | 68—9 X |
| 2,366,136 | 12/1944 | Waldstein | 68—9 |
| 2,530,494 | 11/1950 | Vigerust | 68—9 |
| 2,736,183 | 2/1956 | Arnold | 68—22 |
| 3,123,994 | 3/1964 | Brown et al. | 68—205 |
| 2,552,078 | 5/1951 | Williams | 68—44 |

FOREIGN PATENTS

| 422,067 | 1/1911 | France. |
|---|---|---|
| 429,592 | 5/1935 | Great Britain. |
| 959,200 | 5/1964 | Great Britain. |
| 1,368,857 | 6/1964 | France. |
| 121,082 | 7/1925 | Switzerland. |

WILLIAM I. PRICE, *Primary Examiner.*

U.S. Cl. X.R.

68—22, 44, 62